May 14, 1968  E. E. STRATYNSKI  3,383,041
DUAL FUNCTION THERMAL VACUUM VALVE
Filed Aug. 23, 1966  2 Sheets-Sheet 2
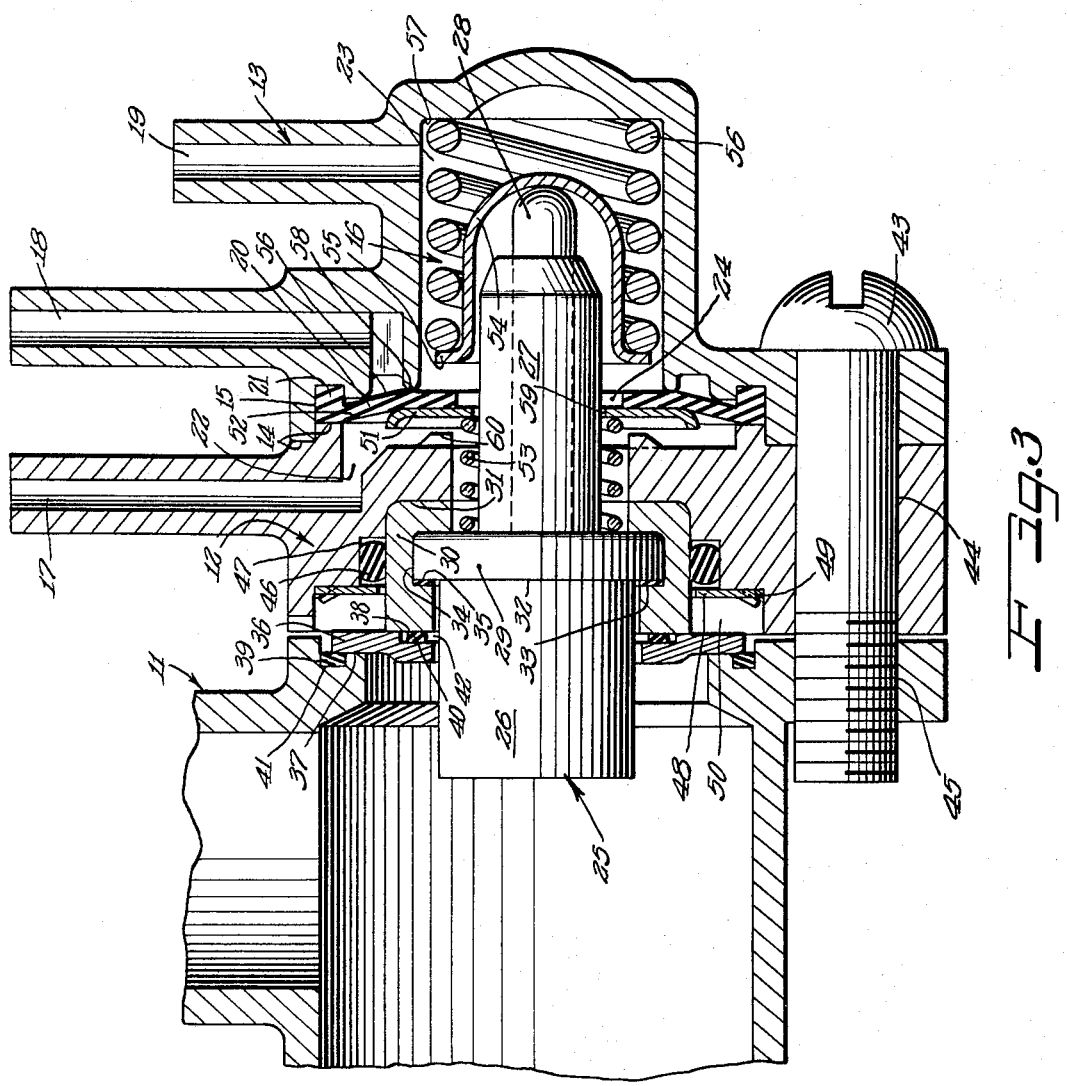
INVENTOR.
Eugene E. Stratynski
BY Hill, Sherman, Meroni, Gross & Simpson  ATTORNEYS United States Patent Office 3,383,041
Patented May 14, 1968

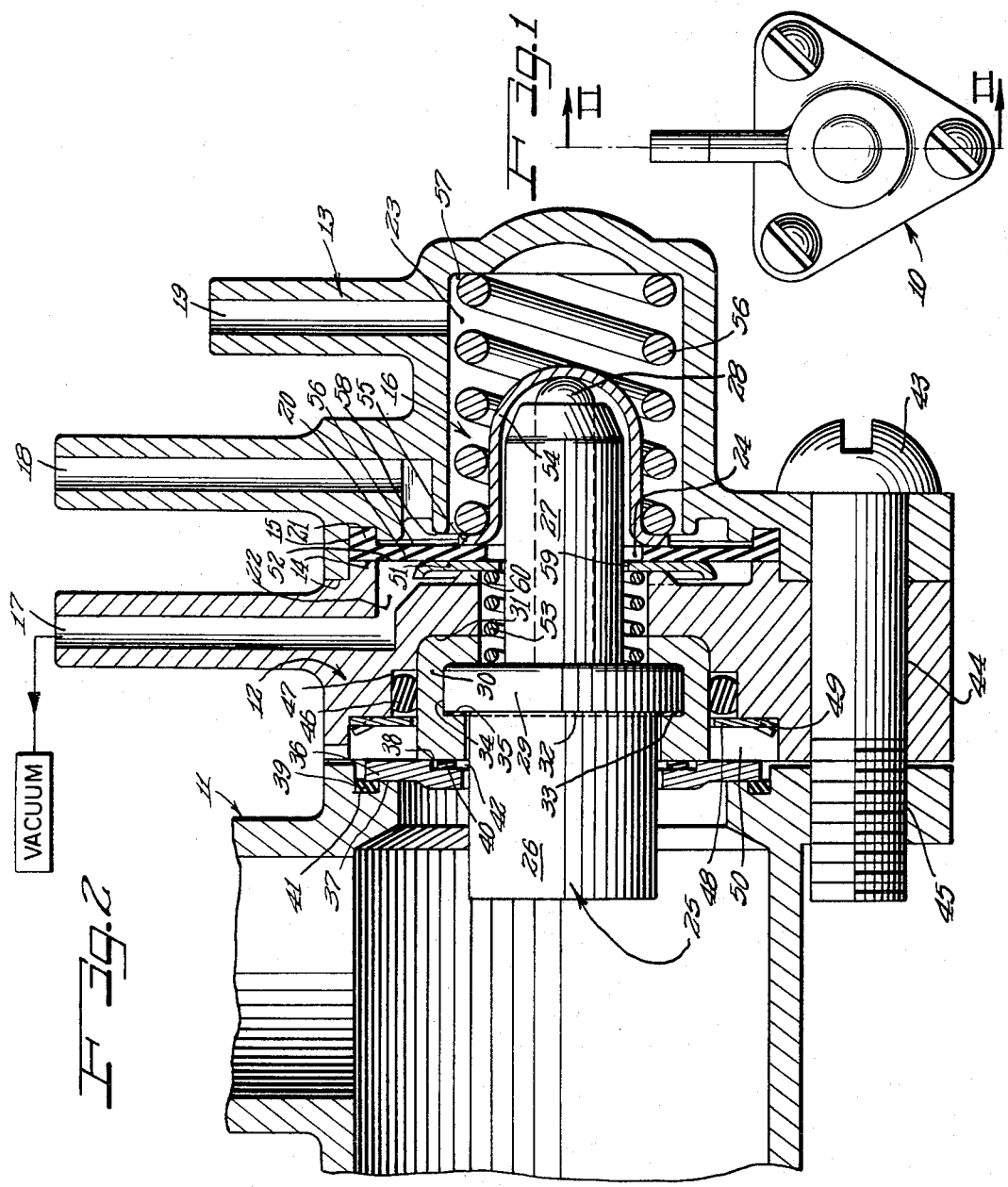

3,383,041
DUAL FUNCTION THERMAL VACUUM VALVE
Eugene E. Stratynski, Morton Grove, Ill., assignor to The Dole Valve Company, Morton Grove, Ill., a corporation of Illinois
Filed Aug. 23, 1966, Ser. No. 574,383
15 Claims. (Cl. 236—86)

ABSTRACT OF THE DISCLOSURE

A dual function valve having a vacuum inlet, a vent port and an outlet and having first and second valve means for sequentially connecting the vacuum inlet to the outlet and enclosing off the vent port and subsequently closing off the vacuum inlet and connecting the outlet to the vent port. The first valve means consists of a resilient diaphragm which is opened and closed with respect to the vent port and the second valve means consists of a spring guide member which is held firmly against the resilient diaphragm to close off the communication of the vacuum inlet relative to either the vent port or the outlet.

---

This invention relates to a dual function valve and in particular relates to a novel valve system for sequentially operating first and second valves in response to the actuation of a thermal power unit.

Valve systems often require in addition to an inlet and outlet, a vent port which must be sequentially opened and closed to permit the proper functioning of the system. For instance, vacuum type powered valve systems may require in addition to an inlet for introducing a vacuum source to a valve cavity and in addition to an outlet for delivering the vacuum from the cavity to a system operator, a vent port which may be opened after the closing of the inlet to relieve the vacuum supply which otherwise would be maintained in the cavity and at the outlet. Essentially, in a vacuum valve the operation of a system operator such as a diaphragm or the like is controlled by changing the pressure delivered to the operator. This is accomplished in two steps, first, the vacuum source must be cut off from the outlet and second, the outlet must be vented to the atmosphere to allow an increase in pressure at the associated diaphragm or the like.

In addition to requiring that the vent port be opened after the closing of the inlet, it is also necessary that the vent port be closed when the inlet is opened to the outlet. This is necessary if the vacuum supply is to be operated at maximum efficiency. If the vent port were continually opened during the opening of the inlet, the vacuum source would be at least partially lost through the vent port thereby decreasing the efficiency of operation at the outlet. On the other hand, if the vent port were made of a sufficiently small cross section such that opening the vent port continually would not result in a large loss of vacuum from the system, the result would be that a large time delay would exist between the closing of the inlet and the venting of the outlet. Accordingly, if a rapid response is desired, a large vent port must be used, and the vent port must be alternately opened and closed respectively with the closing and opening of the inlet.

Accordingly, it is a principal object of this invention to provide a novel and simplified means for sequentially operating two valves of a valve control system.

It is also an object of this invention to provide a dual function vacuum valve having a novel means for closing a vent port and sequentially opening a valve outlet.

It is another object of this invention to provide a dual function valve having a resilient diaphragm deployed between the inlet and both the vent port and outlet of the valve and to provide a means for translating the resilient diaphragm into engagement with the vent port and sequentially opening the inlet to the outlet.

It is a further object of this invention to provide a dual function vacuum valve having an inlet, a vent port, and an outlet and having a resilient diaphragm deployed across a valve chamber intermediate the inlet and the combination of the vent port and the outlet wherein the diaphragm has a central flow port formed therein and wherein means are provided for gripping the diaphragm about the flow port to prevent the flow of pressure between the inlet and both the vent port and the outlet and to sequentially control the closing of the vent port and the opening of the outlet.

It is an additional object of this invention to provide a dual function valve of the type described above, wherein the resilient diaphragm associated therewith is deployed across the valve actuation chamber intermediate the inlet and both the vent port and the outlet, wherein means are provided for biasing the resilient diaphragm on both the inlet and the outlet side thereof and wherein a thermal power unit is extended through a flow port formed centrally within the diaphragm to control the biasing pressure applied to the diaphragm for closing the vent port and sequentially opening the outlet to the inlet.

These and other objects, features and advantages of the present invention will be understood in greater detail from the following description and the associated drawings wherein reference numerals are utilized in designating an illustrative embodiment and wherein:

FIGURE 1 is an elevational view of a dual function vacuum control valve in accordance with this invention;

FIGURE 2 is an enlarged sectional view taken along the lines II—II of FIGURE 1 showing the internal operation of the dual valve structure of this invention; and FIGURE 3 is a sectional view similar to the view shown in FIGURE 2 for illustrating the sequential movement of the valve members of this invention for controllably actuating a system operator connected to the outlet of the dual function valve.

This invention concerns generally a vacuum valve having a vacuum inlet and an outlet connected to a system operator and a vent port for relieving pressure from the outlet when the inlet is in a closed position. The valve of this invention employs a diaphragm which is disposed across the interior of the valve between the inlet and the vent-outlet combination. The diaphragm has a central port formed therein for communicating the inlet with the outlet and a thermal power unit is deployed for moving the diaphragm into and out of engagement with the vent port prior to opening the central flow port of the diaphragm to the outlet. The particular manner in which the movement of the diaphragm into engagement with the vent port and the opening of the central flow port of the diaphragm will be understood from a more detailed consideration of FIGURES 1 through 3 of the drawings.

The vacuum valve comprises a valve body 10 formed in three sections, namely a fluid section 11, a vacuum inlet section 12 and an outlet section 13.

The outlet section 13 is mounted to the inlet section 12 at a stepped region 14 which is so formed as to provide a groove 15 about the inner periphery of the valve. With the outlet section 13 so mounted to the inlet section 12, an actuation chamber 16 is formed at the interior of the valve body 10, and this actuation chamber intercommunicates an inlet 17, a vent port 18 and an outlet 19. While the actuation chamber 16 provides a means of communication between the inlet 17, the vent port 18 and the outlet 19, means are provided to open and close the ports 17, 18 and 19 relative to one another to bring about the desired valve sequencing.

Such a means is provided in the form of a diaphragm 20 which has a bead 21 formed at the outer periphery thereof and wherein the bead 21 is firmly locked within the groove 15 formed at the junction of the outlet section 13 and the inlet section 12. The diaphragm 20 extends inwardly of the actuation chamber 16 and substantially divides the actuation chamber 16 into an inlet portion 22 and an outlet portion 23. The diaphragm 20 is movable within the actuation chamber 16 and has a central flow port 24 formed therein for communicating the inlet section 22 of the actuation chamber 16 with the outlet section 23 thereof.

The diaphragm 20 is actuated by the operation of a thermal power unit 25 which has a casing 26, a guide portion 27 and a power member 28 which is relatively extensible from the casing 26 through the guide member 27. The casing 26 contains a thermally expansible wax, as is well understood, for actuating the power member 28 in response to changes in temperature within the casing 26. The casing 26 has a radially outwardly extending collar 29 formed therearound, and the collar 29 is seated within a ring 30 which, in turn, supports the thermal power unit 25 within the valve 10.

The ring 30 is mounted within a recess 31 formed within the inlet section 12 of the valve 10, and suitable means are provided to seal the thermal power unit between the fluid section 11 and the inlet section 12. One seal used to functionally separate the fluid section 11 from the inlet section 12 is disposed at the rear face 32 of the collar 29 and consists of a resilient member 33 which is fitted tightly about the casing 26 of the power unit 25. The collar 29 is disposed within a complementary groove 34 formed within the ring 30, and the resilient member 33 is disposed between the face 32 of the collar 29 and a face 35 of the groove 34.

The fluid section 11 is further sealed from the inlet section 12 through the use of a washer 36 which is disposed between a face 37 of the inlet section 11 and an end face 38 of the ring member 30. Seal rings 39 and 40 are disposed within grooves 41 and 42 respectively at opposite sides of the washer 36, and the fluid section 11 is accordingly sealed from the inlet section 12.

The three sections, namely the fluid section 11, the inlet section 12 and the outlet section 13, are secured into a single unit through the use of three bolts 43 which are received through a bore 44 and threaded within a bore 45 formed within the fluid section 11. The tightening of the bolts 43, therefore, compress the seals 35, 39 and 40 within their respective grooves to assure that fluid from the fluid section 11 will not be drawn into the vacuum or inlet section 12.

To further assure that fluid from the fluid section 11 will not enter the inlet section 12, a second seal is provided between the inlet section 12, the thermal power unit 25 and the fluid section 11. That seal consists of an O-ring 46 disposed between the ring member 30 and a face 47 of the inlet section 12. A washer 48 is then disposed against the surface 49 of the inlet section 12 and fixes the positioning of the O-ring 46. Also, an atmospheric chamber 50 is formed between the seal provided by the O-ring 46 and the seal provided by the seal rings 39 and 40. In this way, it is assured that fluid within the fluid section 11 will not be drawn by the vacuum of the inlet section 12 into the interior of that section. By creating the atmospheric chamber 15, the vacuum of the inlet section 12 does not act on the seal rings 39 and 40, and the sealing capacity of those rings is to that degree enhanced.

With the thermal power unit 25 mounted within the valve 10 as illustrated, the power member 28 can be used as an effective means for moving the diaphragm 20 within the actuation chamber 16 and for sequentially actuating the vent port 18 and the outlet 19.

The movement of the diaphram 20 is accomplished by providing a backing ring 51 which is disposed against the inlet surface 52 of the diaphragm 20 and which biases the diaphragm 20 though the use of a first biasing spring 52 toward the outlet 19.

The diaphragm 20 is biased toward the inlet 17 through the use of a valve cap 54 which has a seat 55 formed at the inlet side thereof, which seat is seated against the outlet side 56 of the diaphragm 20. The biasing of the valve cap 54 is accomplished through the use of a second bias spring 56 which is deployed between the end wall 57 of the valve 10 and the outlet side of the seat 55 of the cap 54. Accordingly, through the use of the two oppositely directed biasing means 53 and 56, the diaphragm 20 is sandwiched between the backing plate 51 and the seat 55 of the valve cap 54. When the diaphragm 20 is so gripped by the backing plate 51 and the cap 54, the inlet 17 is closed relative to both the vent port 18 and the outlet 19. Also, certain mobility of the diaphragm 20 is allowed within the actuation chamber 16 without effecting the gripped or sandwiched positioning of the backing plate 51 and the valve cap 54.

Considering both FIGURES 2 and 3 jointly, it can be seen that as the temperature of the fluid within the fluid section 11 increases, the thermal wax within the casing 26 of the power unit 25 expands and causes the power member or piston 28 to extend relative to the rigid mounting of the casing 26. Extension of the power member or piston 28 causes the valve cap 54 to move as shown in FIGURE 3 toward the outlet 19. However, initially the movement of the valve cap 54 due to the extension of the power member 28 is followed by the movement of the backing plate 51 and the diaphragm 20. This means that during initial movement of the valve cap 54, the seal between the inlet 17 and the outlet 19 is maintained. This is because the sealing elements, namely the valve cap 54, the diaphragm 20, and the backing plate 51 are moved jointly due to the biasing of the spring 53. The joint movement of the valve cap 54, the diaphragm 23 and the backing plate 51 is halted when the diaphragm 20 contacts an end face 58 of the vent port 18. The end face 58 which is the entrance to the vent port 18 from the actuation chamber 16, is formed substantially perpendicular to the general plane of initial movement of the diaphragm 20 due to extension of the power member piston 28. When the diaphragm 20 contacts the end face 58 in its progression toward the outlet 19, the biasing effect of the spring 53 is resisted, and the further extension of the power member piston 28 causes the valve cap 54 to move independent of the diaphragm 20.

It can be seen from considering the movement of the diaphragm 20 as generated by the extension of the power member piston 28 and augmented by the biasing of the spring 53 against the backing plate 51, that such movement is effective for sequentially operating the vent port and the outlet 18 and 19 respectively. As the diaphragm moves from the position shown in FIGURE 2 to the position shown in FIGURE 3, the point is reached at which the diaphragm contacts the end wall 58 of the vent port 18 thereby closing the vent port relative to the inlet 17. However, it is noted that prior to the closing of the vent port 18, the inlet 17 is maintained closed relative to the outlet 19 through the joint movement of the valve cap 54, the backing plate 51 and the diaphragm 20. Subsequent to the closing of the vent port 18, the outlet 19 is opened to the inlet 17 due to the continued progressive movement of the valve cap 54 away from the surface 56 of the diaphragm 20 and toward the outlet 19. When the valve cap 54 lifts from the surface 56 of the diaphragm 20 due to the contacting of the diaphragm 20 at the end wall 58 of the vent port 18, the central flow port 24 of the diaphragm 20 is exposed to the outlet 19 through the inlet 17 and through a space 59 provided between the guide portion 27 of the power unit 25 and the backing plate 51.

Likewise, when the temperature of the fluid within the fluid section 11 cools, the biasing of the spring 56 causes the valve cap 54 to be moved toward the inlet 17. When the valve cap 54 contacts the side 56 of the diaphragm 20, the ouelt 19 is closed relative to the inlet 17. Subsequent progressive movement of the valve cap 54 toward the inlet 17 causes the diaphragm 20 to be lifted from the end face 58 of the vent port 18 and moved toward a valve stop 60 formed at the inlet section 12. When the backing plate 51 contacts the valve stop 60, further progressive movement of the valve cap 54 toward the inlet 17 is halted, and the inlet 17 is closed relative to both the vent port 18 and the outlet 19, while the vent port 18 and the outlet 19 are communicated around the end face 58 to relieve vacuum previously delivered through the outlet 19 to a system operator or the like and to accordingly deactuate that operator.

It will be understood that various modifications and combinations of the features of this invention may be accomplished by those versed in the art, but I desire to claim all such modifications and combinations as properly come within the spirit and scope of my invention.

I claim as my invention:

1. A dual function valve comprising:
   a valve body having an inlet,
   a vent port, an outlet, and a passageway intercommunicating the inlet, the vent port and the outlet,
   a resilient diaphragm sealably secured about said passageway and extending between said inlet and both said vent port and said outlet and having a port formed substantially centrally thereof,
   first biasing means disposed against the inlet side of said diaphragm and biasing said diaphragm in the direction of said outlet,
   valve cap means disposed against the outlet side of said diaphragm and second biasing means biasing said cap and diaphragm in the direction of said inlet,
   means for selectively moving said valve cap toward said outlet thereby allowing said first biasing means to move said diaphragm toward said outlet with said diaphragm continually compressed between said first biasing means and said valve cap,
   said diaphragm engaging and sealing said vent port during the progression thereof toward said outlet, thereby halting further progression of the diaphragm, and
   means for continuing the movement of said valve cap beyond the point of engagement of said diaphragm at said vent port thereby opening said diaphragm port and exposing said inlet to said outlet.

2. A dual function valve in accordance with claim 1 wherein a backing plate is disposed against the inlet side of said diaphragm between the diaphragm and the first biasing means, wherein said vent port has an end wall disposed substantially parallel to said backing plate at the opposite side of the diaphragm and wherein progressive movement of said valve cap toward said outlet causes said backing plate to urge the diaphragm against the end wall thereby closing the vent port and wherein further progression of said valve cap toward the outlet opens said inlet to said outlet.

3. A dual function valve in accordance with claim 1 wherein said means for selectively moving said valve cap toward said outlet comprises a thermal power unit and wherein said valve cap comprises a stirrup mounted about said thermal power unit and actuable therefrom.

4. A dual function valve in accordance with claim 3 wherein said second biasing means exerts a greater force on said valve cap in the direction of said inlet than said first biasing means exerts on said diaphragm in the direction of said outlet.

5. A dual function valve in accordance with claim 3 wherein said thermal power unit has a casing mounted in substantial axial alignment with the port within the diaphragm, wherein said casing is disposed on the inlet side of the diaphragm and wherein a power member is extensibly mounted within the casing and extends through the diaphragm port to operate the valve cap.

6. A dual function valve in accordance with claim 5 wherein a fluid passageway is formed within said valve body, wherein the casing of said thermal power unit, is disposed in thermal transfer relationship with the fluid passageway, wherein a seal is provided between the thermal power unit and the valve body about said inlet and wherein an atmospheric chamber is provided between the seal and the fluid passageway.

7. A dual function valve comprising:
   a valve body having an inlet,
   a vent port, and an outlet, and a passageway intercommunicating the inlet, vent port, and outlet, first and second valve means in combination sealing said inlet from both said vent port and said outlet,
   means for progressively moving said first and second valve means jointly and sealingly toward said vent port and outlet,
   said first valve means engaging and closing said vent port during said progressive movement of said first and second valve means, and
   means for further progressively moving said second valve means independent of said first valve means toward said outlet thereby opening said inlet to said outlet, while maintaining said vent port closed.

8. A dual function valve comprising:
   a valve body having an inlet, first and second outlets and a passageway interconnecting the inlet and the outlets,
   a resilient diaphragm sealably mounted at the interior of said passageway and extending across said passageway intermediate the inlet and the outlets,
   said resilient diaphragm having a flow port formed therein to allow communication between the inlet and one of the outlets,
   valve means for sealably gripping said diaphragm about said flow port and for translating at least a portion of the diaphragm within the passageway,
   the junction of said first outlet with said passageway being formed substantially perpendicular to the direction of translation of said diaphragm,
   means for selectively moving said diaphragm against the wall forming the junction of said first outlet with said passageway thereby closing said first outlet, and
   means for releasing the grip of said valve means about the flow port of the diaphragm after the closing of the first outlet thereby communicating the inlet through the flow port to the second outlet.

9. A dual function valve in accordance with claim 8 wherein said valve means for sealably gripping the diaphragm about said flow port comprises a backing plate biased against the inlet side of the diaphragm about the periphery of the flow port and having an opening at least a portion of which is coincident with the flow port to allow the flow of fluid therethrough, and a valve cap biased against the outlet side of the diaphragm and gripping the diaphragm about the flow port for closing said flow port.

10. A dual function valve in accordance with claim 9 wherein said means for selectively moving said diaphragm comprises a thermal power unit having a portion thereof extended through the flow port of the diaphragm and the opening of the backing plate and engaging the valve cap to move the valve cap toward the outlet in response to temperature changes registered by the power unit.

11. A dual function valve in accordance with claim 10 wherein said inlet is connected to a vacuum source, wherein a fluid passage is formed within said valve body and wherein the thermal sensitive portion of the thermal power unit extends in thermal transfer relation with fluid present within said fluid passageway.

12. A dual function valve in accordance with claim 11 wherein said fluid passage is sealably separated from said passageway interconnecting the inlet with said outlets, and wherein an atmospheric chamber is formed between the fluid passage and said passageway to prevent the vacuum applied to said inlet from drawing fluid into said passageway.

13. A dual function valve comprising:
   a valve body having three ports and a passageway intercommunicating said three ports,
   a resilient diaphragm sealably secured about said passageway and extending between a first of said ports and both the second and third of said ports and having a passage formed substantially centrally thereof,
   first biasing means disposed against the first port side of said diaphragm and biasing said diaphragm in the direction of said second and third ports,
   valve cap means disposed against the third port side of said diaphragm and second biasing means biasing said cap and diaphragm in the direction of said first port,
   means for selectively moving said valve cap toward said third port thereby allowing said first biasing means to move said diaphragm toward said third port with said diaphragm continually compressed between said first biasing means and said valve cap,
   said diaphragm engaging and sealing said second port during the progression thereof toward said third port thereby halting further progression of the diaphragm, and means for continuing the movement of said valve cap beyond the point of engagement of said diaphragm at said second part thereby opening the passage formed in said diaphragm and exposing said first port to said third port.

14. A dual function valve in accordance with claim 13 wherein a backing plate is disposed against the first port side of said diaphragm between the diaphragm and the first biasing means, wherein said second port has an end wall disposed at the opposite side of the diaphragm and wherein progressive movement of said valve cap toward said third port causes said backing plate to urge the diaphragm against the end wall thereby closing the second port and wherein further progression of said valve cap toward the third port opens said first port to said third port.

15. A dual function valve comprising:
   a valve body having three ports and a passageway intercommunicating said three ports, first and second valve means in combination sealing said first port from both said second port and said third port,
   means for progressively moving said first and second valve means jointly and sealingly toward said second and third ports,
   said first valve means engaging and closing said second port during said progressive movement of said first and second valve means, and
   means for further progressively moving said second valve means independent of said first valve means toward said third port thereby opening said first port to said third port, while maintaining said second port closed.

References Cited
UNITED STATES PATENTS

| | | | |
|---|---|---|---|
| 1,441,449 | 1/1923 | Rich | 236—86 |
| 3,263,925 | 8/1966 | Joesting | 236—87 |
| 3,313,485 | 4/1967 | Harvey | 236—86 |

WILLIAM J. WYE, *Primary Examiner.*